United States Patent Office 3,470,159
Patented Sept. 30, 1969

3,470,159
ESTRA-1,3,5(10),7-TETRAENES AND PROCESS OF PREPARATION
David J. Marshall, Hampstead, Quebec, Canada, assignor to American Home Products Corporation, New York, N.Y., a corporation of Delaware
No Drawing. Filed July 13, 1967, Ser. No. 653,009
Int. Cl. C07c *173/00, 169/08;* A61k *17/06*
U.S. Cl. 260—239.55        17 Claims

ABSTRACT OF THE DISCLOSURE

There is disclosed herein a process for preparing estra-1,3,5(10),7-tetraenes from related estra-1,3,5(10),6,8-pentaenes, comprising treatment of the latter compounds with an alkali or alkaline earth metal in liquid ammonia. There are also disclosed estra-1,3,5(10),7-tetraene-3,16α, 17β- and -3,16β,17β-triols and the 16,17-acetonide and 16,17-acetophenonide of the latter compound. The compounds prepared by the process of this invention have estrogenic properties and methods for their use are also given.

---

This invention relates to a process for preparing estra-1,3,5(10),7-tetraenes of the Formula I:

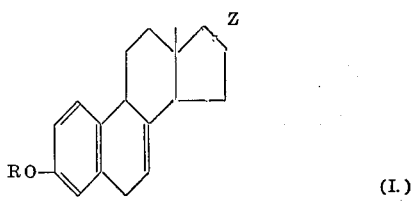

(I.)

in which R represents hydrogen, a lower alkyl group containing from 1–6 carbon atoms, a cycloalkyl group containing 5 or 6 carbon atoms, or the 2-tetrahydropyranyl group, and Z represents carbon atoms 16 and 17 of the steroid nucleus with substituents attached thereto of the following formulae:

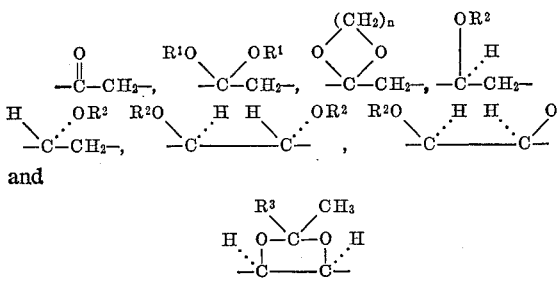

and in which $R^1$ represents a lower alkyl group containing from 1–2 carbon atoms, and $R^2$ represents hydrogen, or the 2-tetrahydropyranyl group, $R^3$ represents the methyl or the phenyl group, and $n$ is an integer from 2–3.

This invention also relates to the novel compounds prepared by the process of this invention.

The estra-1,3,5(10),7-tetraenes prepared according to the process of this invention are powerful estrogens, and are useful in conditions where estrogen therapy is indicated. They may be formulated with suitable excipients for administration orally or by injection, in the form of tablets or capsules, or as sterile solutions in pharmaceutically acceptable vehicles, in dosages of from 0.1–5.0 milligrams.

More specifically, the compounds of this invention are prepared by selective reduction of ring B of steroids of the estra-1,3,5(10),6,8-pentaene type (equilenin type of Formula II) to estra-1,3,5(10),7-tetraene (equilin type of Formula I). A simple one-step process for converting biologically almost useless steroids of the equilenin class to steroids of the equilin class, many of which are powerful estrogens, has not hitherto been available.

The selective partial reduction of ring B of estra-1,3, 5(10),6,8-pentaenes by the process of this invention is entirely unexpected. It is well-known for example, that catalytic reduction of equilenin results mainly in attack on ring A and no estra-1,3,5(10),7-tetraenes are formed. It is also known that reaction of 3-alkoxyestra-1,3,5(10), 6,8-pentaenes with alkali metals and alcohols in liquid ammonia results in partial reduction of rings A and B, and estra-1,3,5(10),7-tetraenes cannot be obtained directly. The high degree of selectivity of the process of this invention which results substantially only in partial reduction of ring B of the easily available estrapentaenes is highly surprising in view of the foregoing and provides a very attractive route to the biologically valuable estrogen equilin and its derivatives.

This process may be represented by the following formulae:

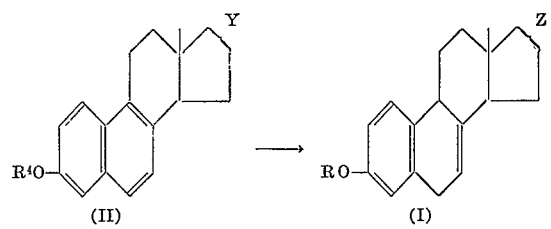

(II)         (I)

in which R and Z have the definitions noted above, $R^4$ represents hydrogen, lower alkyl group containing from 1–6 carbon atoms, a lower acyl group containing from 2–4 carbon atoms, a cycloalkyl group containing from 5–6 carbon atoms, or the 2-tetrahydropyranyl group, and Y represents carbon atoms 16 and 17 of the steroid nucleus with substituents attached thereto of the following formulae:

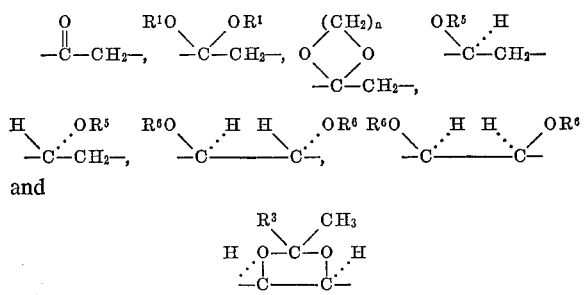

and in which $R^1$, $R^3$ and $n$ are as defined above, $R^5$ represents hydrogen, lower acyl groups containing from 2–4 carbon atoms, or the 2-tetrahydropyranyl group, and $R^6$ represents the 2-tetrahydropyranyl group.

It is preferable that R be hydrogen or a lower acyl group and that there be no other free hydroxyl or carbonyl groups in the starting material. Hydroxyl and carbonyl groups at positions 16 and 17 may be conveniently protected during the reduction by prior formation of ketal-type derivatives, such as, for example, ethylene ketals of 17-ketones and 2-tetrahydropyranyl ethers of 17-alcohols or 16,17-diols. These protecting groups may be removed by mild acid hydrolysis after completion of the reduction.

Some preferred starting materials are equilenin ethylene ketal, 17β - (2-tetrahydropyranyloxy)estra-1,3,5(10),6,8-pentaen-3-ol acetate, 17α-(2-tetrahydropyranyloxy)estra-1,3,5(10),6,8-pentaen-3-ol acetate, 16α,17β-bis-(2-tetrahydropyranyloxy)estra-1,3,5(10),6,8-pentaen-3-ol acetate, 16β,17β-bis - (2 - tetrahydropyranyloxy)estra - 1,3,5(10), 6,8-pentaen-3-ol acetate, estra-1,3,5(10),6,8-pentaene-3, 16β,17β-triol acetonide, and estra-1,3,5(10),6,8-pentaene-3,16β,17β-triol acetophenonide.

These starting materials can be prepared by conventional methods from equilenin or from known derivatives of equilenin. Thus, for example, equilenin acetate can be reduced with sodium borohydride to give the corresponding 17β-ol and the latter can be treated with dihydropyran in the presence of an acid catalyst to form 17β-(2-tetrahydropyranyloxy)estra-1,3,5(10),6,8-pentaen-3-ol acetate. The corresponding 17α-substituted compound can be made from equilenin using the procedure of R. Gardi, C. Pedrali, and A. Ercoli, Gazz. Chim. Ital. 93, 1028 (1963), which involves hydride reduction of 16α-bromoequilenin acetate to give principally the 17α-ol, debromination with Raney nickel, and formation of the tetrahydropyranyl ether. Estra-1,3,5(10),6,8-pentaene-3,16,17-triols can be preferentially acetylated at C–3 using the procedure of O. V. Dominguez, J. R. Seely, and J. Gorski, Anal. Chem. 35, 1243 (1963) and then converted to the 16, 17-bis-tetrahydropyranyl ethers. Estra-1,3,5(10),6,8-pentaene-3,16β,17β-triol may be converted to the acetonide or acetophenonide by acid-catalyzed reaction with acetone or acetophenone.

The partial reduction of ring B of the above starting materials to give the desired estra-1,3,5(10),7-tetraenes is carried out by reaction with a solution of an alkali or alkaline earth metal in liquid ammonia. The metal can be lithium, sodium, potassium or calcium. The reaction can be carried out in the presence of a co-solvent for the steroid, preferably of the ether type. Suitable solvents are diethyl ether, tetrahydrofuran, dioxane and 1,2-dimethoxyethane. However, good results are also obtained in the absence of an organic solvent. The temperature can be in the range −70° C. to the boiling point of liquid ammonia (−33°), but is preferably kept in the range −65 to −70° C. At the end of the reaction, the excess metal is decomposed by adding a proton source such as an alcohol, water, or ammonium chloride, the ammonia is allowed to evaporate, and the product is isolated by extraction with a water-immiscible solvent such as, for example, diethyl ether, and evaporation of the solvent. If desired, further purification may be carried out by chromatography and/or crystallization.

Optionally, protective ketal groupings may be removed by treatment with dilute mineral acid or a sulfonic acid such as, for example, p-toluenesulfonic acid.

The following examples will illustrate this invention.

Example 1.—Equilenin ethylene ketal

A mixture of 8.0 g. of equilenin, 0.8 g. of p-toluenesulfonic acid, and 80 ml. of ethylene glycol in 670 ml. of benzene is stirred and refluxed for 5.5 hours through a modified water separator which is kept in an ice-bath. The cooled solution is washed with saturated sodium bicarbonate solution and with water, dried and evaporated. Crystallization from chloroform-hexane yields the title compound with M.P. 163–165° C.

In the same manner, but using propane-1,3-diol instead of ethylene glycol, equilenin trimethylene ketal is obtained.

Example 2.—Equilin

To 300 ml. of liquid ammonia in a three-necked flask kept in a solid carbon dioxide acetone bath at −70° C. is added 3.6 g. of lithium metal cut into small pieces. After stirring for 10 minutes, a solution of 5.00 g. of equilenin ethylene ketal in 100 ml. of dry tetrahydrofuran is added dropwise over a period of 15 minutes and the solution is stirred at −70° C. for 4 hours. At the end of this time, solid ammonium chloride is added in small portions until the dark blue colour is discharged, and the ammonia is allowed to evaporate with stirring overnight. Ether and water are then added, and the organic phase is separated, washed thoroughly with water, dried over magnesium sulfate, and evaporated.

The residue is dissolved in 70 ml. of acetone, 20 ml. of 10% hydrochloric acid is added, and the solution is kept at 40–50° C. for one hour. The solution is then concentrated and extracted with ethyl acetate. After washing with water, drying, and evaporating the solvent, a crude product is obtained which, by gas chromatographic analysis, contains 81% equilin. On passage through a column of silica gel using benzene and ether-benzene 5:95 as eluents and crystallization from methanol-water, equilin is obtained as a crystalline solid with M.P. 234–237° C. The M.P. is not depressed on admixture with an authentic sample.

Equilin is also obtained when the reduction of equilenin ethylene ketal is carried out at −70° C. using potassium instead of lithium or at −33° C. using sodium, lithium or calcium. Diethyl ether, dioxane, or 1,2-dimethoxyethane may be substituted for tetrahydrofuran, and good yields of equilin are also obtained when the ketal is added directly without an organic solvent.

Similarly, reduction of equilenin trimethylene ketal followed by acid hydrolysis yields equilin.

Example 3.—Equilenin dimethyl ketal

A mixture of 1.00 g. of equilenin, 1 ml. of trimethyl orthoformate and one drop of concentrated sulfuric acid in 15 ml. of methanol is heated under reflux for 10 minutes. The acid is neutralized with a few drops of pyridine, the solution is concentrated under reduced pressure, and the residue is extracted with ether. After washing with water, drying, and evaporation of the solvent, the title compound is obtained as a yellow foam with $\nu_{max}$ 3580, 3300, 1110, 1125, and 1155 cm.$^{-1}$.

In the same manner using triethyl instead of trimethyl orthoformate and ethanol instead of methanol, equilenin diethyl ketal is also obtained.

Example 4.—Equilin

The reduction of equilenin dimethyl or diethyl ketal with lithium in liquid ammonia is carried out as described in Example 2. The crude product is dissolved in methanol containing 10% by volume of 10% aqueous hydrochloric acid. After 30 minutes at room temperature the solution is diluted with water and the precipitated product is crystallized from aqueous methanol to yield equilin.

Example 5.—17β-(2-tetrahydropyranyloxy)estra-1,3,5(10),6,8-pentaen-3-ol acetate

A suspension of 5.6 g. of equilenin acetate in 200 ml. of methanol is stirred and cooled to −10° C. and 1.0 g. of sodium borohydride is added. After 15 minutes, the excess hydride is decomposed with acetic acid, the solution is concentrated under reduced pressure, and water is added. Filtration yields estra-1,3-5(10),6,8-pentaene-3,17β-diol 3-acetate, M.P. 147–152° C. A mixture of 300 mg. of the latter compound 8 mg. of p-toluenesulfonic acid, and 0.5 ml. of dihydropyran in 15 ml. of benzene is stirred for 2 hours at room temperature. After adding a drop of pyridine, the solution is diluted with ether, washed with water, dried, and evaporated to give the title compound as a pale yellow oil.

Similarly, equilenin propionate and butyrate are converted to the propionate and butyrate of 17β-(2-tetrahydropyranyloxy)estra-1,3,5(10),6,8-pentaen-3-ol.

Example 6.—17β-dihydroequilin (A) The reduction of 380 ml. of 17β-(2-tetrahydropyranyloxy)-estra-1,3,5(10),6,8-pentaen-3-ol acetate obtained as described in Example 5 with 800 mg. of lithium in 60 ml. of liquid ammonia and 9 ml. of tetrahydrofuran is carried out as described in Example 2. After 4 hours at −70° C. the blue colour is discharged by adding ethanol, the ammonia is allowed to evaporate, and the product is isolated by ether extraction. The crude product is dissolved in 5 ml. of methanol, 0.5 ml. of 10% hydrochloric acid is added, and the solution is kept one hour at room temperature. The title compound is isolated by extraction with ethyl acetate, and is found to be identical with an authentic sample by ultraviolet spectroscopy and gas-liquid chromatography.

Similarly, reduction of the propionate and butyrate of 17β-(2-tetrahydropyranyloxy)estra - 1,3,5(10),6,8 - pentaen-3-ol with lithium in liquid ammonia followed by acid treatment yields 17β-dihydroequilin.

(B) To a stirred solution of 0.31 g. of lithium in 60 ml. of liquid ammonia at −70° C. is added a solution of 0.50 g. of equilenin in 7 ml. of tetrahydrofuran. After 4 hours, ammonium chloride is added, the ammonia is allowed to evaporate, and the reaction product is isolated by ether extraction. 17β-dihydroequilenin and 17β-dihydroequilin in approximately equal amounts are identified by ultraviolet spectroscopy and gas liquid chromatography.

(C) To a stirred refluxing solution of 900 mg. of lithium in 75 ml. of liquid ammonia is added a solution of 500 mg. of 17β-dihydroequilenin in 10 ml. of tetrahydrofuran. After stirring for 4 hours, 15 ml. of ethanol is added rapidly, the ammonia is allowed to evaporate, and the reaction product is extracted with ether. 17β-dihydroequilin is identified by gas-liquid chromatography.

In the same manner, reduction of 17β-dihydroequilenin diacetate, diproprionate or dibutyrate yields 17β-dihydroequilin.

Example 7.—17β-dihydroequilin-3-methyl ether

Equilenin methyl ether is reduced with sodium borohydride to 17β-dihydroequilenin-3-methyl ether, and the latter is converted to the corresponding 17β-(2-tetrahydropyranyl)-ether by the method described in Example 5. Reduction of this compound with lithium in liquid ammonia followed by acid treatment yields 17β-dihydroequilin methyl ether, identical with an authentic sample, by gas-liquid chromatography.

Similarly, the ethyl, propyl, butyl, pentyl, hexyl, cyclohexyl, and 2-tetrahydropyranyl ethers of equilenin may be converted to the corresponding ethers of 17β-dihydroequilin.

Example 8.—17α-dihydroequilin

Following the general procedure described by R. Gardi, et al. cited above, equilenin acetate is converted, via the enol diacetate, to 16α-bromoequilenin acetate. The latter compound is reduced with lithium aluminium tri-t-butoxyhydride to give, principally, 16α-bromoestra-1,3,5(10),6,8-pentaene-3,17α-diol 3-acetate which is debrominated with Raney nickel in boiling ethanol to yield 17α-dihydroequilenin 3-acetate. The latter compound is converted to 17α-(2-tetrahydropyranyloxy) - estra - 1,3,5(10),6,8-pentaen-3-ol acetate by reaction with dihydropyran and p-toluenesulfonic acid in benzene, and the latter compound is reduced with lithium in liquid ammonia as described in Example 2. After cleavage of the tetrahydropyranyl ether grouping with dilute hydrochloric acid, the product is identified as 17α-dihydroequilin by ultraviolet spectroscopy and gas-liquid chromatography.

Example 9.—Estra-1,3,5(10),7-tetraene-3-16α,17β-triol

Using the method described by N. S. Leeds, D. K. Fukushima and T. F. Gallagher in J. Am. Chem. Soc., 76, 2943 (1954), equilenin acetate is converted to the enol diacetate by reaction with acetic anhydride in the presence of p-toluenesulfonic acid and thence to the 16α,17α-epoxide with m-chloroperbenzoic acid. Reduction of the epoxide with lithium aluminium hydride yields estra-1,3,5(10),6,8-pentaene-3,16α,17β-triol.

A solution of 500 mg. of this last named compound in 13 ml. of 1:31 acetic anhydride-pyridine is kept for 24 hours at room temperature and then poured into ice-water. The corresponding 3-acetate is isolated by ether extraction. It is dissolved in 10 ml. of benzene, 0.5 ml. of dihydropyran and 20 mg. of p-toluenesulfonic acid are added, and the solution is stirred at room temperature for 4 hours. Neutralization, extraction and washing with water yields 16α,17β-bis-(2 - tetrahydropyranyloxy)estra - 1,3,5(10),6,8-pentaen-3-ol acetate.

The latter compound is reduced with lithium in liquid ammonia by the procedure described in Example 2. After acid cleavage of the protecting 2-tetrahydropyranyl groups, estra-1,3,5(10),7-tetraene-3,16α,17β-triol is obtained with $\lambda_{max.}$ 280 m$\mu$, $\epsilon$ 2100 (ethanol).

Example 10.—Estra-1,3,5(10),7-tetraene-3,16β,17β-triol

The known (Huffman, U.S. Patent No. 3,002,983) estra-1,3,5(10),6,8-pentaene-3,16β,17β-triol is converted to the 3-acetate and thence to the 16,17-bis-tetrahydropyranyl ether as described for the corresponding 3,16α,17β-triol in Example 9. Reduction with lithium in liquid ammonia as in Example 2 followed by acid cleavage of the tetrahydropyranyl groups yields the title compound, which crystallizes from aqueous methanol with M.P. 248–249° C., $[\alpha]_D + 239°$ (methanol).

Example 11.—Estra-1,3,5(10),7-tetraene-3,16β,17β-triol 16,17-acetonide

A suspension of 2.00 g. of estra-1,3,5(10),6,8-pentaene-3,16β,17β-triol in 50 ml. of acetone containing 0.3 ml. of 70% perchloric acid is stirred for one hour at room temperature. The steroid goes rapidly into solution. Neutralization of the acid with pyridine, concentration, and dilution with water, yields the 16,17-acetonide. The latter compound, dissolved in ether, is reduced with lithium in liquid ammonia at −70° C. as described in Example 2. After isolation of the crude product, crystallization from aqueous methanol yields the title compound with M.P. 212–213° C., $[\alpha]_D + 238°$.

Similarly, reaction of estra-1,3,5(10),6,8-pentaen-3,16β,17β-triol with acetophenone instead of acetone followed by reduction with lithium in liquid ammonia yields estra-1,3,5(10),7-tetraene - 3,16β,17β - triol 16,17-acetophenonide, $\nu_{max}$ 3600, 3450, 1600, 1500, 1065 cm.$^{-1}$.

Treatment of the acetonide or acetophenonide with dilute hydrochloric acid yields estra-1,3,5(10),7-tetraene-3,16β,17β-triol, M.P. 248–249° C.

I claim:

1. A process for preparing estra-1,3,5(10),7-tetraenes of the formula

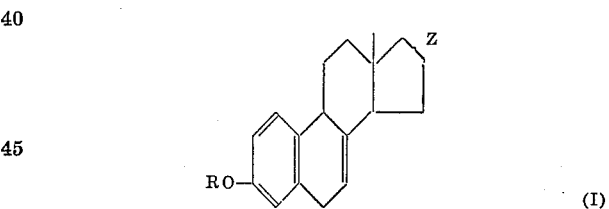

in which R is selected from the group consisting of hydrogen, lower alkyl groups containing from 1–6 carbon atoms, cycloalkyl groups containing from 5–6 carbon atoms, and the 2-tetrahydropyranyl group, and Z represents carbon atoms 16 and 17 of the steroid nucleus with substituents attached thereto selected from the groups represented by the following formulae:

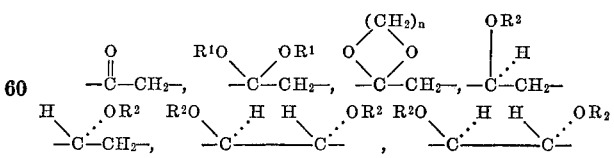

and

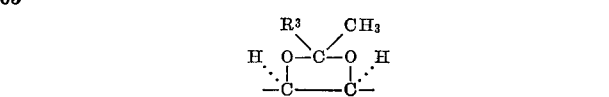

in which $R^1$ is selected from the group consisting of lower alkyl groups containing from 1–2 carbon atoms, $R^2$ is selected from the group consisting of hydrogen and the 2-tetrahydropyranyl group, $R^3$ is selected from the group consisting of methyl and phenyl, and $n$ is an integer selected from the group consisting of 2 and 3, comprising treating an estra-1,3,5(10),6,8-pentaene of the formula:

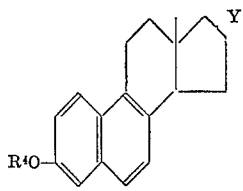

(II)

in which $R^4$ is selected from the group consisting of hydrogen, lower alkyl groups containing from 1-6 carbon atoms, lower acyl groups containing from 2-4 carbon atoms, cycloalkyl groups containing from 5-6 carbon atoms, and the 2-tetrahydropyranyl group, and Y represents carbon atoms 16 and 17 of the steroid nucleus with substitutents attached thereto selected from the group represented by the following formulae:

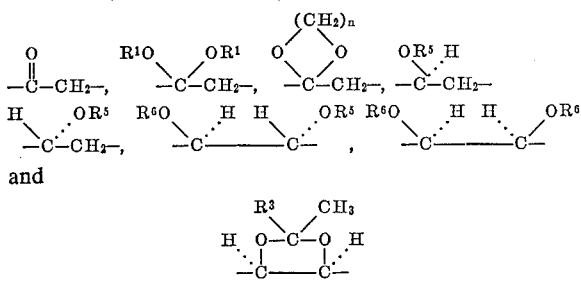

and in which $R^1$, $R^3$ and $n$ are as defined above, $R^5$ is selected from the group consisting of hydrogen, lower acyl group containing from 2-4 carbon atoms, and the 2-tetrahydropyranyl group, and $R^6$ is the 2-tetrahydropyranyl group with a metal selected from the group consisting of lithium, sodium potassium, and calcium in liquid ammonia, adding a proton source, evaporating the ammonia, and isolating the reaction product.

2. A process as claimed in claim 1 in which the reaction product is further treated with a strong acid to remove protective ketal groupings.

3. A process as claimed in claim 1 in which the treatment with a metal dissolved in liquid ammonia is carried out within the temperature range of from $-33°$ C. to $-70°$ C.

4. A process as claimed in claim 1 in which the metal is lithium.

5. A process as claimed in claim 1 in which the metal is sodium.

6. A process as claimed in claim 1 in which the proton source is selected from the group consisting of lower alkanols, water, and ammonium chloride.

7. A process as claimed in claim 2 in which the starting material is selected from the group consisting of equilenin dimethyl ketal and ethylene ketal, the product is treated with a strong acid, and equilin is obtained.

8. A process as claimed in claim 2 in which the starting material is 17β-(2-tetrahydropyranyloxy)estra-1,3,5(10), 6,8-pentaen-3-ol acetate, the product is treated with a strong acid, and 17β-dihydroequilin is obtained.

9. A process as claimed in claim 2 in which the starting material is 17α-(2-tetrahydropyranyloxy)estra-1,3,5(10), 6,8-pentaen-3-ol acetate, the product is treated with a strong acid, and 17α-dihydroequilin is obtained.

10. A process as claimed in claim 2 in which the starting material is 16β,17β-bis-(2-tetrahydropyranyloxy)-estra-1,3,5(10),6,8-pentaen-3-ol acetate, the product is treated with a strong acid and estra-1,3,5(10),7-tetraene-3, 16β,17β-triol is obtained.

11. A process as claimed in claim 2 in which the starting material is 16α,17β-bis-(2-tetrahydropyranyloxy)-estra-1,3,5(10),6,8-pentaen-3-ol acetate, the product is treated with a strong acid, and estra-1,3,5(10),7-tetraene-3,16α,17β-triol is obtained.

12. A process as claimed in claim 1 in which the starting material is estra-1,3,5(10),6,8-pentaene-3,16β,17β-triol 16,17-acetonide and estra-1,3,5(10),7-tetraene-3,16β, 17β-triol 16,17-acetonide is obtained.

13. A process as claimed in claim 1 in which the starting material is estra-1,3,5(10),6,8-pentaene-3,16β,17β-triol 16,17-acetophenonide and estra-1,3,5(10),7-tetraene-3, 16β,17β-triol 16,17-acetophenonide is obtained.

14. Estra-1,3,5(10),7-tetraene-3,16α,17β-triol.

15. Estra-1,3,5(10),7-tetraene-3,16β,17β-triol.

16. Estra - 1,3,5(10),7 - tetraene-3,16β,17β-triol 16,17-acetonide.

17. Estra - 1,3,5(10),7 - tetraene-3,16β,17β-triol 16,17-acetophenonide.

No references cited.

ELBERT L. ROBERTS, Primary Examiner

U.S. Cl. X.R.

260—397.5, 999